(12) United States Patent
Leicht et al.

(10) Patent No.: US 8,904,770 B2
(45) Date of Patent: Dec. 9, 2014

(54) MIXING AND/OR EVAPORATING DEVICE

(71) Applicant: J. Eberspächer GmbH & Co. KG, Esslingen (DE)

(72) Inventors: Sebastian Leicht, Bisingen (DE); Felix Neumann, Esslingen (DE); Benjamin Arlt, Aichwald (DE); Oleksandr Semenov, Plochingen (DE); Silvia Calvo, Esslingen (DE); Joachim Braun, Esslingen (DE); Tobias Wolf, Köngen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 65 days.

(21) Appl. No.: 13/628,885

(22) Filed: Sep. 27, 2012

(65) Prior Publication Data

US 2013/0074483 A1 Mar. 28, 2013

(30) Foreign Application Priority Data

Sep. 28, 2011 (DE) .......................... 10 2011 083 637

(51) Int. Cl.
| | |
|---|---|
| *F01N 3/24* | (2006.01) |
| *B01F 5/06* | (2006.01) |
| *B01F 3/04* | (2006.01) |
| *B01F 5/04* | (2006.01) |
| *F01N 3/28* | (2006.01) |

(52) U.S. Cl.
CPC ............ *F01N 3/2892* (2013.01); *B01F 5/0617* (2013.01); *B01F 3/04049* (2013.01); *F01N 2240/20* (2013.01); *B01F 5/0616* (2013.01); *B01F 5/0451* (2013.01); *B01F 2005/0639* (2013.01)
USPC ............................................. 60/301; 60/317

(58) Field of Classification Search
USPC ............ 60/295, 301, 303, 317; 366/337, 340
See application file for complete search history.

(56) References Cited

U.S. PATENT DOCUMENTS

| | | | |
|---|---|---|---|
| 3,438,198 A | 4/1969 | Bentele | |
| 3,444,687 A | 5/1969 | Andersson | |
| 4,600,544 A * | 7/1986 | Mix ............................. | 261/79.2 |
| 4,981,368 A | 1/1991 | Smith | |
| 7,533,520 B2 * | 5/2009 | Cheng et al. .................... | 60/286 |
| 2008/0267780 A1 | 10/2008 | Wirth | |
| 2009/0071133 A1 | 3/2009 | Mabuchi | |

(Continued)

FOREIGN PATENT DOCUMENTS

| | | |
|---|---|---|
| CN | 101627190 A | 1/2010 |
| DE | 10 2006 055 036 A1 | 5/2008 |
| DE | 10 2006 059 761 A1 | 6/2008 |
| DE | 10 2008 020 827 A1 | 11/2009 |
| EP | 2 111 917 A1 | 10/2009 |
| WO | WO 2011053013 A2 * | 5/2011 |

*Primary Examiner* — Thomas Denion
*Assistant Examiner* — Jonathan Matthias
(74) *Attorney, Agent, or Firm* — McGlew and Tuttle, P.C.

(57) ABSTRACT

A mixing and/or evaporating device (12) for an exhaust system (5) of a combustion engine (1), in particular of a motor vehicle, includes a support body which encloses a cross section of the device (12) through which a flow can flow and which runs transversely to the axial direction (20) of the device (12) in the circumferential direction. The support body (19) has at least one guide blade (25, 28) which extends away transversely to the axial direction (20). An improved efficiency is obtained with the guide blade (25) having a roof-shaped profile (29), including two guide surfaces (30, 31) that are interconnected via a ridge (32) or apex.

20 Claims, 2 Drawing Sheets

(56) References Cited

U.S. PATENT DOCUMENTS

| | | |
|---|---|---|
| 2010/0083643 A1 | 4/2010 | Hayashi et al. |
| 2010/0107617 A1 | 5/2010 | Kaiser et al. |
| 2011/0174407 A1 | 7/2011 | Lundberg et al. |

* cited by examiner

MIXING AND/OR EVAPORATING DEVICE

CROSS REFERENCE TO RELATED APPLICATIONS

This application claims the benefit of priority under 35 U.S.C. §119 of German Patent Application DE 10 2011 083 637.3 filed Sep. 28, 2011, the entire contents of which are incorporated herein by reference.

FIELD OF THE INVENTION

The present invention relates to a mixing and/or evaporating device for an exhaust system of a combustion engine, in particular of a motor vehicle. The invention additionally relates to an exhaust system equipped with such a device and to an SCR catalytic converter equipped with such a device.

BACKGROUND OF THE INVENTION

Usually, an exhaust system of a combustion engine is equipped with devices for cleaning or re-treating the exhaust gases conducted away from the combustion engine. There it can be necessary to introduce a liquid educt into the exhaust gas flow, to evaporate it therein and intermix it with the exhaust gas. For example, it may be required to admix a fuel to the exhaust gas upstream of an oxidation catalytic converter in order to bring about a heating-up of the exhaust gas flow through an exothermic conversion of the fuel in the oxidation catalytic converter. The heated-up exhaust gas flow can then be utilized downstream of the oxidation catalytic converter for heating up a further exhaust gas retreatment device to operating temperature or to regeneration temperature, for example another catalytic converter or a particle filter. Furthermore, SCR systems are known, which operate with selective catalytic reaction and are equipped with an SCR catalytic converter which absorbs NOx from the exhaust gas flow. Upstream of the SCR catalytic converter a suitable reaction agent is fed to the exhaust gas flow, for example ammonia or urea, preferentially a watery urea solution. In the SCR catalytic converter the ammonia then causes a conversion of the embedded nitric oxides into nitrogen and water.

With respect to all educts fed into the exhaust gas flow in liquid form it is true that the desired effect can be satisfactorily achieved only when between the introduction point of the liquid educt and a consumer location of the educt an adequate evaporation of the educt as well as an adequate mixing-through of the gaseous educt with the exhaust gas flow can take place. For this purpose, the mixing and/or evaporating devices mentioned at the outset are employed, which are arranged in the flow path of the exhaust gas between the introduction point of the educt and the consumption point of the educt.

SUMMARY OF THE INVENTION

The present invention deals with the problem of providing an improved or at least another embodiment for a device of the type mentioned at the outset or for an SCR catalytic converter equipped with such or for an exhaust system equipped with such, which is characterized by a simple and thus cost-effective construction, while in addition a low through-flow resistance is aimed at. Furthermore, an improved flow distribution over the cross section is aimed at, which advantageously leads to a reduction of the back pressure.

The invention is based on the general idea, with a device comprising a support body which encloses a cross section of the device, through which a flow can flow and which runs transversely to the axial direction of the device, in the circumferential direction, and on which at least one guide blade is arranged, which extends away transversely to the axial direction, to equip at least one such guide blade with a roof-shaped profile. By using at least one guide blade having a roof-shaped profile, an impact area for liquid educt introduced into the exhaust gas flow within the mixing and/or evaporating device can be enlarged so that the risk of a droplet strike-through through the device is reduced. Accordingly, the efficiency of the device with respect to the evaporation effect can be increased. The roof-shaped profiling of the at least one guide blade additionally results in that on the respective guide blades the exhaust gas flow is deflected towards two sides, so that an intensive mixing-through can also be realized. In addition, the exhaust gas flow partially takes along the liquid educt striking the guide blade, as a result of which it is distributed on the guide blade, which favours the evaporation.

Particularly practically, the roof-shaped profile is effected in such a manner that the roof-shaped profile of the respective guide blade comprises two guide surfaces, which are interconnected via a ridge or apex. For example, the profile can be formed in the manner of a gabled roof, so that an angled ridge region interconnects two flat guide surfaces. Likewise, the profile can form a barrel roof, wherein two curved roof surfaces merge into one another via a round apex. Mixed forms are likewise conceivable, so that for example two curved guide surfaces are interconnected via an angular ridge. The two guide surfaces, which are interconnected via the ridge or the apex extend to a guide surface edge, at a distance from the ridge or the apex, which guide surface edge is axially spaced from the ridge or the apex (e.g., each such guide surface edge may be axially rearwardly of the axially forward ridge or apex).

The device introduced here is additionally characterized in that the respective blade row, regardless of whether it is arranged on the inflow side or on the outflow side, can be substantially subjected to a swirl-free flow by the exhaust gas flow. In other words, the exhaust gas flow is not imparted a swirl when flowing around the guide blades or when flowing through a blade row of the device. Because of this, the device receives a particularly low through-flow resistance.

According to a particularly advantageous embodiment, the respective ridge or the respective apex can be arranged on the inflow side. Practically, the two guide surfaces are then angled opposite with respect to the axial direction. In particular, the two guide surfaces with respect to the amount can have the same angle of inclination relative to the axial direction, as a result of which a symmetrical flow deflection or flow division on the respective roof-shaped guide blade is obtained.

With another advantageous embodiment, the respective guide blades can be exclusively connected to the support body via the one guide surface. This produces a design for the device that can be particularly easily realized.

With a practical further development, the other guide surface can be arranged in a freestanding manner with respective to the support body. In other words, the other guide surface has no contact with the support body and is connected to the latter only indirectly, namely via the one guide surface.

With an additional further development, provision can be made that the respective guide blade is also arranged so as to be free-standing in the region of the ridge with respect to the support body. Hereby, in particular thermal expansion effects are possible without a build-up of tension.

Additionally or alternatively, provision can be made that the respective blade has two substantially rectangular guide surfaces which on the edge side have respectively four rectilinear sides, wherein in each case a side of the two guide blades adjoin one another in the ridge and wherein the respective guide blade is connected with the support body only via a single one of these sides. In other words, of the six sides lying on the outside, which define the circumferential edge of the guide blades, only one is connected with the support body, whereas the others are arranged thereto loosely or free-standing, i.e. without contact thereto. The two sides lying on the inside lie against one another in the ridge.

A particularly compact construction is produced when several guide blades are provided, which project from the support body in a first direction, which is perpendicular to the axial direction of the device, are arranged adjacent to one another in a second direction, which second direction extends perpendicularly to the axial direction and perpendicularly to the first direction.

Practically, it can be provided with another embodiment, that the profile of the respective guide blade is configured in an angular or arc-shaped manner. An angular profile leads to the gabled roof shape mentioned before, while the arc-shaped profile leads to the barrel roof shape mentioned before. With another advantageous embodiment, the respective guide blade with the roof-shaped profile can be arranged on an inflow side of the support body, wherein on an outflow side of the support body at least one further guide blade is arranged, which has another profile. The other profile can for example be a linear profile, which is angled relative to the axial direction. In particular, the support body can thus comprise at least one conventional guide blade without roof-shaped profile on the outflow side.

The individual guide blades with linear profile or the guide surfaces of the guide blades with roof-shaped profiling can be configured flat. Flat guide blades or guide surfaces always have the same inclination angle along their longitudinal direction relative to the exhaust gas flow or relative to the axial direction. It is likewise possible in principle to provide at least one or all guide blades or guide surfaces twisting, so that their inclination angle along the longitudinal direction of the guide blade varies.

According to an advantageous further development, the respective guide blade arranged on the outflow side can be arranged axially aligned with an outflow edge of one of the guide surfaces of the guide blade with roof-shaped profile arranged on the inflow side and cover the latter to the axial direction. In this manner, an impact surface of the guide blade on the outflow side is aligned with an outflow edge of the roof-shaped guide glade on the inflow side. With this embodiment, liquid striking the roof-shaped guide blade on the inflow side can be redirected through the flow forces on the guide surfaces, reach an outflow edge of the respective guide surface and there, taken along by the exhaust gas flow in the form of at least one drop and then strike the guide surface of the guide blade on the outflow side, where it is again to the exhaust gas inflow and an intensive evaporation action. The design introduced here thus reduces the risk of a droplet strike-through the device. It is remarkable in this connection that the roof-shaped profiled guide blades on the inflow side bring about a division of the exhaust gas flow and of the educt flow carried along, so that in each case only half the flow of exhaust gas an educt strikes the guide blades on the outflow side, in particular the guide blades which are not profiled in a roof-like manner, as a result of which the area that is available for the evaporation of the educt flow is doubled in relative terms.

According to a particularly practical embodiment, the cross section of the device through which a flow can flow is flat. This means that in a first direction which runs perpendicularly to the axial direction, a diameter (dimension) of the cross section through which a flow can flow is larger than a diameter (dimension) in a second direction, which runs perpendicularly to the first direction and perpendicularly to the axial direction, as a result of which the cross section of the device through which a flow can flow significantly differs from a circular cross section. For example, the diameter (dimension) of the flat cross section through which a flow can flow is at least twice as large in the first direction as in the second direction. Through this design, the device can be installed in a particularly simple manner into a flat-design exhaust system or in a flat-design housing of an exhaust gas treatment device, e.g. an SCR catalytic converter. Practically, the support body can then comprise two long side walls located opposite each other and two short side walls located opposite each other, wherein the short side walls in each case interconnects the two long side walls. The long side walls in this case can be flat or curved. The short side walls can be preferably curved. Thus, oval or elliptical cross sections are likewise flat in principle.

The terms "long" and "short" must not be understood in absolute terms, but relatively, so that these merely serve to express that a long side wall has a greater extension in the circumferential direction of the support body than a short side wall.

The at least one guide blade with the roof-shaped profile is then practically arranged on a long side wall at least on an axial end of the side wall or of the support body or of the device and extends away from this long side wall in the direction of the other long side wall. Through this design it is possible in a particularly simple manner to form a guide blade row on the support body, which comprises a plurality of guide blades running parallel to one another arranged next to one another transversely to the axial direction. In particular, the individual guide blades in this case extend perpendicularly to the axial direction and perpendicularly to the direction in which they are arranged next to one another in the respective linear blade row.

For arranging such blade rows on the long side walls of the support bodies, there are different combination possibilities. For example, a blade row can be arranged only on an axial end and only on a long side wall. It is likewise possible that only on an axial end on both long side walls, guide blades stand away which either engage into one another in order to form a common blade row or which each form there own blade row. Starting out from the associated long side wall, the individual guide blades can then extend for example as far as to approximately a longitudinal centre plane, which lies centrally between the two long side walls. Alternatively, it is likewise possible to provide at least one blade row each on both axial ends, wherein the associated guide blades then originate either from the same long side wall or originate from different-length side walls.

An exhaust system according to the invention comprises at least one SCR catalytic converter, a reduction agent feeding device, which comprises at least one injector for feeding a reduction agent to the exhaust gas flow upstream of the SCR catalytic converter, and at least one mixing and/or evaporating device of the type described above, which is arranged between the at least one injector and the at least SCR catalytic converter.

By contrast, an SCR catalytic converter according to the invention comprises a housing in which at least one SCR catalytic converter element is arranged, and at least one mixing and/or evaporating device of the type described above, which is arranged in the housing of the SCR catalytic converter upstream of the at least one SCR element.

It is to be understood that the features mentioned above and still to be explained in the following cannot only be used in the respective combination stated but also in other combinations or by themselves without leaving the scope of the present invention.

Preferred exemplary embodiments of the invention are shown in the drawing and are explained in more detail in the following description, wherein same reference characters relate to same or similar or functionally same components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
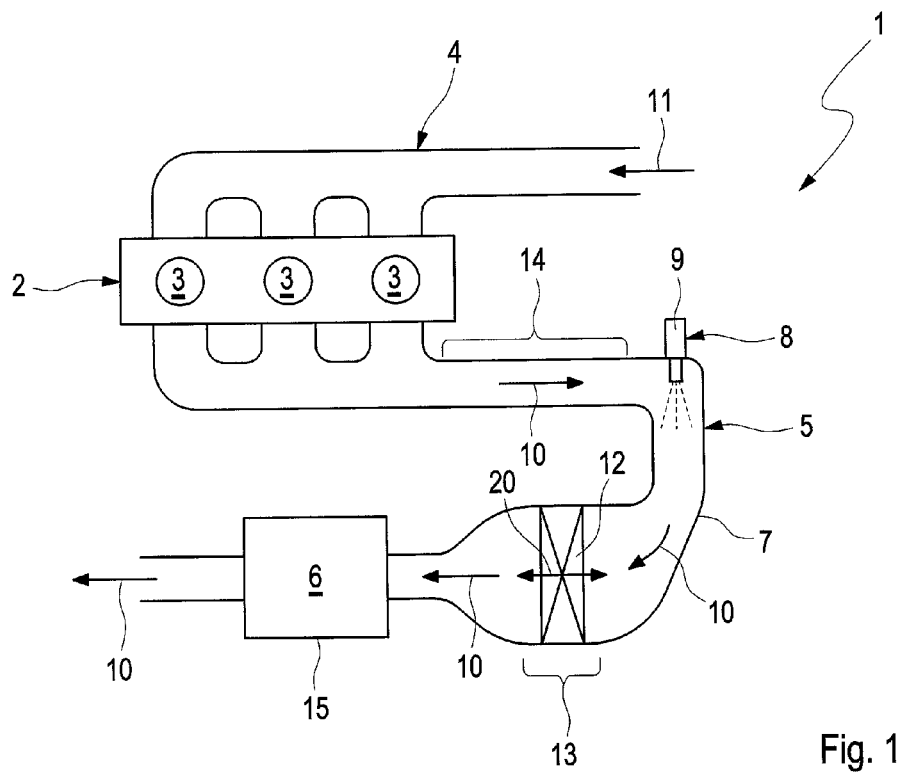
FIG. 1 is a highly simplified schematic representation in the manner of a circuit diagram of a combustion engine with an exhaust system.

According to FIG. 1, a combustion engine 1 comprises in the usual manner an engine block 2, which comprises a plurality of cylinders 3. A fresh air system 4 supplies the cylinders 3 of the engine block 2 with fresh air. A corresponding fresh air stream in this case is indicated by an arrow 11. During the operation of the combustion engine 1, an exhaust system 5 leads combustion exhaust gases away from the cylinders 3 of the engine block 2. Furthermore, the exhaust system 5 brings about an exhaust gas cleaning or exhaust gas retreatment. To this end, the exhaust system 5 is equipped with at least one SCR catalytic converter 6, which is incorporated in an exhaust gas line 7 of the exhaust system 5 in a suitable manner. Furthermore, the exhaust system 5 comprises a reduction agent feeding device 8, which comprises at least one injector 9, with the help of which a reduction agent can be introduced into an exhaust gas flow 10, which during the operation of the combustion engine 1 flows in the exhaust gas line 7 and is indicated by arrows. Injecting the liquid reduction agent into the exhaust gas flow 10 in this case takes place upstream of the SCR catalytic converter 6.

Furthermore, the exhaust system 5 comprises at least one mixing and/or evaporating device 12, which in the following is designated device 12 in short. The device 12 in this case is arranged in the exhaust gas line 7 between the injector 9 and the SCR catalytic converter 6, so that the exhaust gas with the fed-in reduction agent first has to flow through the device 12 before the mixture reaches the SCR catalytic converter 6.

In a region 13, in which the device 12 is arranged, the exhaust gas line 7 can have a flat through-flow cross section while for example in a region 14, which is located upstream of the injector 9, a circular cross section can be present. Here, the cross-sectional areas can be identical in size or different in size in the sections 13, 14.

With the embodiment shown in FIG. 1, the device 12 is arranged in the exhaust gas line 7 upstream of the SCR catalytic converter 6 and thus provided separately from the SCR catalytic converter 6. In particular, the device 12 is located outside a housing 15 of the SCR catalytic converter 6 here.

Figure 2:
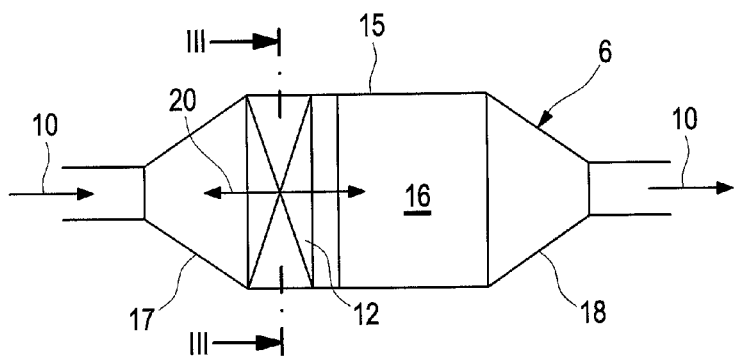
FIG. 2 a highly simplified schematic view of an SCR catalytic converter in the manner of a circuit diagram.

In contrast with this, FIG. 2 shows an embodiment, wherein the SCR catalytic converter 6 and the device 12 form an integral unit. To this end, at least one SCR catalytic converter element 16 is arranged in the housing 15 of the SCR catalytic converter 6, wherein in the housing 15 upstream of this SCR catalytic converter element 16 the device 12 is additionally arranged. Thus, the device 12 and the SCR catalytic converter element 16 are arranged in a common housing 15. In the example of FIG. 2, the housing 15 comprises an inlet funnel 17 and an outlet funnel 18, wherein the device 12 and the SCR catalytic converter element 16 are arranged between the two funnels 17, 18.

Figure 3:
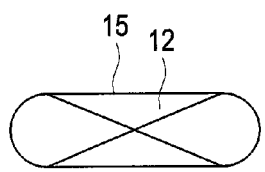
FIG. 3A is a cross section each of the SCR catalytic converter corresponding to section lines III in FIG. 2, showing one of different embodiments.
FIG. 3B is a cross section each of the SCR catalytic converter corresponding to section lines III in FIG. 2, showing another of different embodiments.
Figure 3:
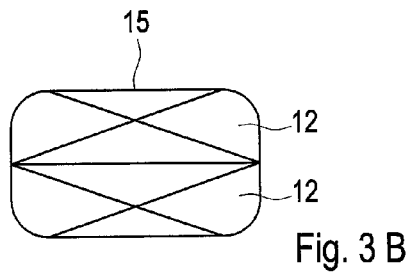

According to the FIGS. 3A and 3B, the housing 15 can have a flat cross section at least in the region of the device 12, to which the respective device 12 is adapted. This means that in a first direction which runs perpendicularly to the axial direction, a diameter (dimension) of the cross section through which a flow can flow is larger than a diameter (dimension) in a second direction, which runs perpendicularly to the first direction and perpendicularly to the axial direction, as a result of which the cross section of the device through which a flow can flow significantly differs from a circular cross section. FIG. 3A in this case shows an embodiment, wherein the cross section of the housing 15 through which a flow can flow is filled out with the help of a single device 12. In contrast with this, FIG. 3B shows an embodiment, wherein the cross section of the housing 15 through which a flow can flow is filled out with the help of two devices 12 arranged next to each other. In a similar manner, this applies also to the arrangement of the device 12 in the exhaust gas line 7, so that at least two devices can also be arranged next to each other in the region 13 in order to fill out the cross section of the exhaust gas line 7 through which a flow can flow.

Figure 4:
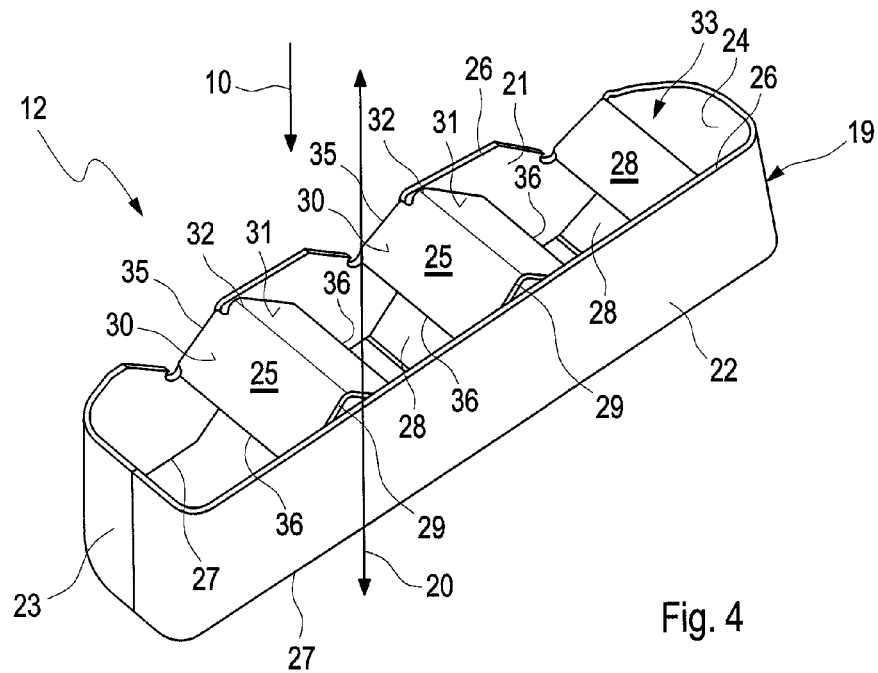
FIG. 4 is an isometric view of a mixing and/or evaporating device in an inflow viewing direction.
Figure 5:
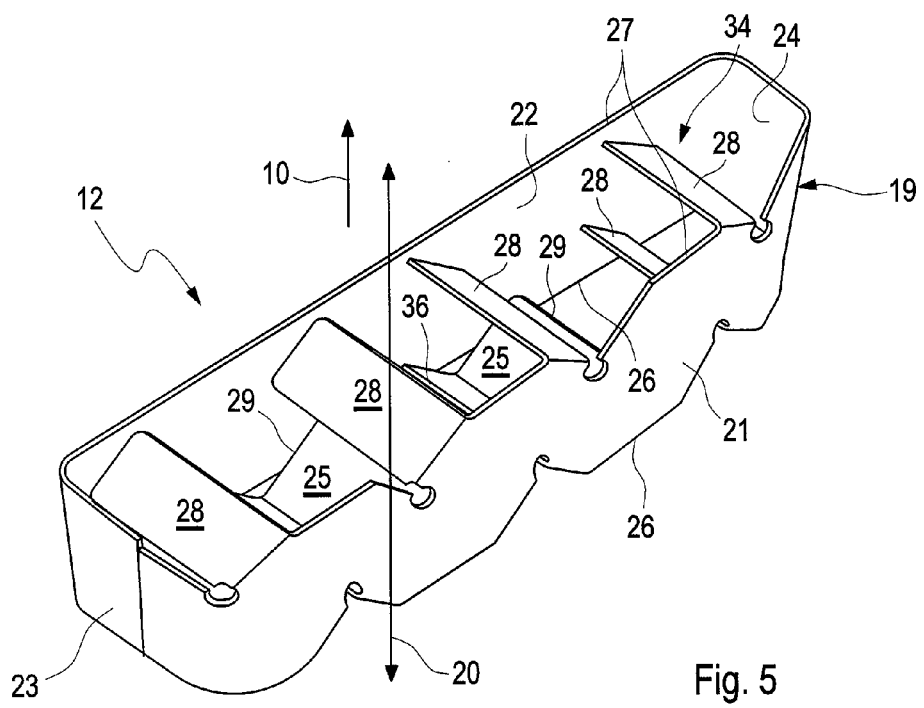
FIG. 5 is an isometric view of the device as in FIG. 4, however in an outflow viewing direction.

Corresponding to the FIGS. 4 and 5, the respective device 12 comprises a support body 19, which is shaped so that it encloses a cross section of the device 12 through which a flow can flow, which extends transversely to an axial direction 20 of the device indicated in the FIGS. 1, 2, 4 and 5 by a double arrow in the circumferential direction. With the preferred embodiments shown here, this cross section of the device 12 through which a flow can flow is designed flat, so that the support body 19 also receives a flat shape. Accordingly, the support body 19 has two long side walls 21, 22 located opposite each other and two short side walls 23, 24 located opposite each other, via which the two long side walls 21, 22 are interconnected. The device 12 or the support body 19 has two axial ends 26, 27 which also axially delimit the side walls 21, 22, 23, 24. Dependent on the flow direction of the exhaust gas flow 10 indicated in the FIGS. 4 and 5 by an arrow, the axial ends 26, 27 on the one hand relate to an inflow side, which in the following is likewise designated 26 and on the other hand two an outflow side, which in the following is likewise designated 27.

In the example of the FIGS. 4 and 5, the support body 19 comprises a plurality of guide blades 25, 28 both on the inflow side 26 as well as on the outflow side 27, each of which originate from a long side wall 21 and extend in the direction of the other long side wall 22. In the shown example, the guide blades 25, 28 each originate from the same side wall 21, so that no guide blades 25, 28 originate from the other side wall 22.

At least one of the guide blades 25, 28, here the guide blades 25 designated 25 have a roof-shaped profile 29 comprising two guide surfaces 30, 31 and a ridge 32 or apex 32, which interconnects the two guide surface 30, 31. In the shown example, the respective profile 29 is designed as gabled roof or angularly, as a result of which an angular ridge 32 and flat guide surfaces 30, 31 are present. Alternatively, the profile 29 can also be designed arch-shaped or as barrel roof, so that the guide surfaces 30, 31 are rounded off or arch-shaped and tangentially merge into one another via the apex 32. The two guide surfaces 30, 31, which are interconnected via the ridge or the apex 32 extend to a guide surface edge 36, at a distance from the ridge or the apex 32, which guide surface edge 36 is axially spaced from the ridge or the apex (e.g., each such guide surface edge 36 may be axially rearwardly of the axially forward ridge or apex 32).

In the shown example, a plurality of guide plates 25, 28 are arrange next to one another on the inflow side 26 transversely to their longitudinal extension, in which they extend from the one long side wall 21 in the direction of the other side wall 22, as a result of which they form a blade row 33 on the inflow side. In the example, the blade row 33 on the inflow side comprises exactly three guide blades 25, 28, namely two guide blades 25 with roof-shaped profile 29 and one guide blade 28 with a conventional linear profile. On the outflow side 27, the guide blades 28 are likewise arranged next to one another transversely to their longitudinal direction, as a result of which they form a blade row 34 on the outflow side. The blade row 34 on the outflow side in this case comprises four conventional blades 28 of the same type without roof-shaped profile 29, preferentially with a linear profile.

Within the respective blade row 33, 34, the blades 25, 28 extend parallel to one another and perpendicularly to the axial direction 20. Furthermore, they are arranged perpendicularly the axial direction 20 next to one another.

With the example shown here, the roof-shaped guide blades 25 with their ridge 32 are arranged on the inflow side, so that the ridge 32 is subjected to an inflow first and causes a division of the exhaust gas flow 10. The two guide surfaces 30, 31 interconnected via the ridge 32 are then angled opposite relative to the axial direction 20. With symmetrical design, the guide surfaces 30, 31 have the same inclination angle in the amount relative to the axial direction 20.

In the blade row 33 on the inflow side, the conventional guide blade 28 likewise has the same inclination angle in the amount relative to the axial direction 20 as the guide surfaces 30, 31 of the roof-shaped guide blades 25.

In contrast with this, the blade row 34 on the outflow side shows two conventional guide blades 28, which are angled in the one direction relative to the axial direction 20, and two conventional guide blades 28, which are angled relative to the axial direction 20, i.e. in the opposite direction. The inclination angles of the individual guide surfaces 30, 31 or of the individual guide blades 28 in this case can each be the same size in the amount and for example be around approximately 45°.

According to FIG. 4, the respective roof-shaped guide blade 25 is only connected to the support body 19 or to its long side wall 21 via the one guide surface 30. To this end, the respective guide blade 25 can be angled off from the respective long side wall 21 along a connecting line 35. Along this connecting line 35, the one or first guide surface 30 is then connected to the long side wall 21. The other or second guide surface 31 is connected to the first guide surface 30 via the ridge 32 and thus only indirectly connected to the respective long side wall 21. In particular, the second guide surface 31 is free-standing with respect to the support body 19, i.e. arranged completely without contact. In particular, the respective second guide surface 31 thus neither touches the one long side wall 21 nor the other long side wall 22 located opposite. Otherwise, all guide blades 25, 28 are arranged with their end that is distant from the associated long side wall 21, from which the respective guide blade 25, 28 originates, spaced from the long side wall 22 located opposite, so that here, too, there is no contact between guide blades 25, 28 and the long side wall 22 located opposite.

The roof-shaped guide blades 25 arranged on the inflow side have as inflow edge the ridge that both guide surfaces 32, 31 have in common. Furthermore, an outflow edge 36 each is formed on both guide surfaces 30, 31 spaced (laterally and also axially) from the ridge 32. The positioning of the guide blades 28 on the outflow side is practically carried out so that these are positioned axially aligned with said outflow edges 36, covering these transversely to the axial direction 20. Thus, a drop which detaches from an outflow edge 36 parallel to the axial direction 20 can directly strike one of the guide blades 28 on the outflow side.

In particular, the device 12 is produced from a single sheet metal strip through forming, so that the guide blades 25, 28 are integrally formed on the respective long side wall 21 and the side walls 21, 22, 23, 24 are also an integral part of the support body 19.

While specific embodiments of the invention have been shown and described in detail to illustrate the application of the principles of the invention, it will be understood that the invention may be embodied otherwise without departing from such principles.

What is claimed is:

1. A mixing and/or evaporating device for an exhaust system of a combustion engine, the device comprising:
a support body which encloses a cross section of the device through which a flow can flow and which runs transversely to an axial direction of the device in a circumferential direction, said support body comprising a first side wall and a second side wall; and
a guide blade arranged on the support body, the guide blade extending transversely to the axial direction, the guide blade having a roof-shaped profile comprising two guide surfaces which are interconnected via a ridge or apex, said guide blade being connected to said support body via one of said two guide surfaces, another of said two guide surfaces being arranged in a free-standing manner relative to said support body, said another of said two guide surfaces extending from a first position adjacent to said first side wall to a second position adjacent to said second side wall, wherein said another of said two guide surfaces extends transversely to the axial direction.

2. The device according to claim 1, wherein the ridge or apex is arranged on an inflow with the two guide surfaces extending from the ridge or apex at an angle toward an outflow side.

3. The device according to claim 1, wherein the guide blade is exclusively connected to the support body via said one of the two guide surfaces, at least a portion of said one of the two guide surfaces being in direct contact with said support body.

4. The device according to claim 3, wherein the another of the two guide surfaces is arranged perpendicular to the one of the two guide surfaces.

5. The device according to claim 4, wherein a region of the ridge of the guide blade is also arranged in a free-standing manner relative to the support body, said ridge or apex being located at a spaced location from said support body.

6. The device according to claim 4, wherein:
the two guide surfaces are rectangular or substantially rectangular, each with four edge sides, wherein the an edge side of each of the two guide surfaces adjoin one another at the ridge, wherein said another of the two guide surfaces is not in contact with said support body; and
the guide blade is connected with the support body only via one single edge side of one of the two guide surfaces.

7. The device according to claim 1, further comprising additional guide blades cooperating with the guide blade to provide a plurality of guide blades, the additional guide blades being arranged on the support body, each of the additional guide blades extending transversely to the axial direction and having a roof-shaped profile comprising two additional guide surfaces which are interconnected via a ridge or apex wherein the plurality of guide blades project from the support body in a first direction, which extends perpendicularly to the axial direction of the device, the guide blade and the additional guide blades being arranged adjacent to one another in a second direction, which extends perpendicularly to the axial direction and perpendicularly to the first direction, each of said additional guide blades being connected to said support body exclusively via one of said two additional guide surfaces, another of said two additional guide surfaces being arranged in a free-standing manner relative to said support body, wherein said another of said two additional guide surfaces does not contact said support body.

8. The device according to claim 1, wherein the profile of the guide blade is configured angularly or arc-shaped.

9. The device according to claim 1, further comprising a further guide blade, wherein:
the guide blade having the roof-shaped profile is arranged on an inflow side of the support body; and
the further guide blade is arranged on an outflow side of the support body.

10. The device according to claim 9, wherein the further guide blade arranged on the outflow side is arranged axially aligned with an outflow edge of one of the guide surfaces of the guide blade with roof-shaped profile arranged on the inflow side, covering the guide blade with roof-shaped profile transversely to the axial direction, said outflow edge being parallel to said further guide blade.

11. The device according to claim 1, wherein:
a cross section of the device through which a flow can flow is flat, in that the support body has two long side walls located opposite each other and two short side walls located opposite each other, in that the short side walls each interconnect the two long side walls,
the guide blade with the roof-shaped profile is arranged on an axial end of one of the long side walls and extends away in a direction of another of the other long side walls.

12. A mixing and/or evaporating device for an exhaust system of a combustion engine, the device comprising:
a support body with a circumferential extent which encloses a cross section of the device through which a flow can flow and which runs transversely to an axial direction of the device, said support body comprising a side wall;
a guide blade arranged on the support body and positioned in the device in a region through which the flow can flow, the guide blade including two guide surfaces, which are interconnected via a ridge or an apex and extend from the ridge or the apex to a guide surface edge at a distance from the ridge or the apex, the guide surface edge being axially spaced from the ridge or the apex, one of said two guide surfaces and said wall defining a single connection area, said guide blade being connected to said support body only at said single connection area; and
a further guide blade, the guide blade having the roof-shaped profile being arranged on an inflow side of the support body, the further guide blade being arranged on an outflow side of the support body, the further guide blade arranged on the outflow side being arranged axially aligned with an outflow edge of one of the guide surfaces of the guide blade with roof-shaped profile arranged on the inflow side, covering the guide blade with roof-shaped profile transversely to the axial direction, said one of said two guide surfaces being parallel to said further guide blade, wherein only one side of said further guide blade is connected to said support body.

13. The device according to claim 12, wherein the ridge or apex is arranged on an inflow side with the two guide surfaces extending from the ridge or apex at an angle toward an outflow side such that each such guide surface edge is axially rearwardly of the axially forward ridge or apex, said ridge or apex extending continuously, without interruption, along said two guide surfaces, said ridge or apex being located at a spaced location from said support body.

14. The device according to claim 12, wherein the guide blade is connected to the support body only via one of the two guide surfaces, wherein one side of said one of the two guide surfaces engages said support body and another side of said one of the two guide surfaces is located at a spaced location from said support body.

15. The device according to claim 14, wherein another of the two guide surfaces is arranged in a free-standing manner relative to the support body, wherein said another of the two guide surfaces does not contact said support body.

16. The device according to claim 15, wherein a region of the ridge of the guide blade is also arranged in a free-standing manner relative to the support body, said another of the two guide surfaces being connected to said support body exclusively via said ridge or apex and said one of the two guide surfaces.

17. The device according to claim 12, further comprising additional guide blades cooperating with the guide blade to provide a plurality of guide blades, the additional guide blades being arranged on the support body, each of the additional guide positioned in the device in a region through which the flow can flow and comprising two guide surfaces which are interconnected via a ridge or apex wherein the plurality of guide blades project from the support body in a first direction, which extends perpendicularly to the axial direction of the device, the guide blade and the additional guide blades being arranged adjacent to one another in a second direction, which extends perpendicularly to the axial direction and perpendicularly to the first direction, each of said additional guide blades being connected to said support body exclusively via one of said two additional guide surfaces, another of said two additional guide surfaces being arranged in a free-standing manner relative to said support body, wherein said another of said two additional guide surfaces does not contact said support body.

18. The device according to claim 12, wherein:
the cross section of the device through which a flow can flow has a first direction which runs perpendicularly to the axial direction with a dimension of the cross section through which a flow can flow that is larger than a dimension in a second direction, which runs perpendicularly to the first direction and perpendicularly to the axial direction;
the support body has two long side walls located opposite each other and two short side walls located opposite each other, in that the short side walls each interconnect the two long side walls; and
the guide blade is arranged on an axial end of one of the long side walls and extends away in a direction of another of the other long side walls.

19. A motor vehicle combustion engine exhaust system comprising:
a flow structure defining a flow path for an exhaust gas flow;
an SCR catalytic converter operatively connected to said flow structure for flow through by at least a portion of the exhaust gas flow;
a reduction agent feeding device comprising at least one injector for feeding a reduction agent to the exhaust gas flow, the injector being disposed upstream of said SCR catalytic converter; and
a mixing and/or evaporating device for an exhaust system of a combustion engine, the device comprising a support body which encloses a cross section of the device through which a flow can flow and which runs transversely to an axial direction of the device and a guide blade arranged on the support body, said support body having a first wall and a second wall, the guide blade extends transversely to the axial direction, the guide blade having a roof-shaped profile comprising two guide surfaces which are interconnected via a ridge or apex, said guide blade being connected to said support body exclusively via one of said two guide surfaces, wherein said one of said two guide surfaces extends, transversely to the axial direction of the device, from a position at or adjacent to said first wall to a position at or adjacent to said second wall.

20. The system according to claim 19, wherein:
the flow structure defining a flow path comprises a housing;
the SCR catalytic converter element is arranged in the housing;
the mixing and/or evaporating device is arranged in the housing upstream of the SCR catalytic converter element, wherein another one of said two guide surfaces does not contact said support body, said ridge or apex being located at a spaced location from said support body.

\* \* \* \* \*